(12) United States Patent  (10) Patent No.: US 9,116,062 B2
Akiyama et al.  (45) Date of Patent: Aug. 25, 2015

(54) DYNAMOMETER SYSTEM

(71) Applicant: MEIDENSHA CORPORATION, Tokyo (JP)

(72) Inventors: Takao Akiyama, Tokyo (JP); Yoshimasa Sawada, Tokyo (JP)

(73) Assignee: Meidensha Corporation, Tokyo (JP)

( * ) Notice: Subject to any disclaimer, the term of this patent is extended or adjusted under 35 U.S.C. 154(b) by 0 days.

(21) Appl. No.: 14/406,914

(22) PCT Filed: Jun. 12, 2013

(86) PCT No.: PCT/JP2013/066276
§ 371 (c)(1),
(2) Date: Dec. 10, 2014

(87) PCT Pub. No.: WO2013/187453
PCT Pub. Date: Dec. 19, 2013

(65) Prior Publication Data
US 2015/0142341 A1    May 21, 2015

(30) Foreign Application Priority Data
Jun. 13, 2012  (JP) ................. 2012-133992

(51) Int. Cl.
*G01L 3/24* (2006.01)
*G01M 13/02* (2006.01)

(52) U.S. Cl.
CPC ............... *G01L 3/24* (2013.01); *G01M 13/025* (2013.01)

(58) Field of Classification Search
CPC ............... G01L 3/24; G01L 3/00; G01L 3/02; G01L 3/04; G01L 3/045; G01L 5/00; G01L 5/26; G01M 13/02; G01M 13/022; G01M 13/025; G01M 13/027
See application file for complete search history.

(56) References Cited

FOREIGN PATENT DOCUMENTS

| JP | 61-086631 A | 5/1986 |
| JP | 5-087697 A | 4/1993 |
| JP | 8-137555 A | 5/1996 |
| JP | 4016582 B2 | 12/2007 |
| JP | 2009-133714 | 6/2009 |
| JP | 2011-078192 A | 4/2011 |

OTHER PUBLICATIONS

Akiyama et al., Control of Standard Engine Test Bench System for Dynamic Road Load Tests, Oct. 18-21, 2006, SICE-ICASE International Joint Conference 2006 in Bexco, Busan, Korea, pp. 1566-1569.*

* cited by examiner

*Primary Examiner* — Toan Le
(74) *Attorney, Agent, or Firm* — Muncy, Geissler, Olds & Lowe, P.C.

(57) ABSTRACT

Provided is a test system capable of stable torque control. A test system is provided with: an excitation torque command calculation unit which calculates an excitation torque command value; a shaft torque command calculation unit which defines a value obtained by adding up a base torque command value and the excitation torque command value as a torque command value; a controller which determines a first control input value such that a shaft torque detection value becomes the shaft torque command value; a feedforward input calculation unit which defines a value obtained by removing components equal to or less than a predetermined frequency from the shaft torque command value as a second control input value; and an addition unit which defines a value obtained by adding up the first and second control input values as a torque current command value.

5 Claims, 5 Drawing Sheets

DYNAMOMETER SYSTEM

TECHNICAL FIELD

The present invention relates to a dynamometer system.

BACKGROUND ART

A drive train is a collective term referring to a plurality of devices for transmitting energy generated in an engine to driving wheels; and the drive train is configured by an engine, a clutch, a transmission, a drive shaft, a propeller shaft, a differential gear, driving wheels, etc. In a performance evaluation test of the drive train, the transmission of the engine is actually driven in a continuous manner to evaluate durability performance, quality, etc. Recently, as a system for testing such a drive train, a dynamometer system has been proposed, in which a dynamometer in place of a real engine generates driving torque that is input into a test piece.

In such a dynamometer system, a torque controller controls torque of a dynamometer, on the basis of an output from a torque detector such as a load cell or a shaft torque sensor. The torque controller to be used is designed based on various feedback algorithms such as PID control and µ-design method (see Patent Document 1).

In a real engine, periodic torque fluctuation is generated due to combustion strokes in each cylinder. Accordingly, in a dynamometer system, in order to imitate torque fluctuation of such a real engine, the test reproducibility is improved by causing the torque of the dynamometer to fluctuate at a predetermined period and amplitude, while revolving an input shaft of the test piece. More specifically, a direct-current base torque component for generating constant driving torque is combined with an alternating-current excitation torque component, which is characterized by predetermined excitation frequency and excitation amplitude; and the combined component is used as a torque command to be input into the torque controller (see Patent Document 2).

PRIOR ART DOCUMENT

Patent Document

Patent Document 1: Japanese Unexamined Patent Application, Publication No. 2009-133714
Patent Document 2: Japanese Patent No. 4016582

DISCLOSURE OF THE INVENTION

Problems to be Solved by the Invention

Incidentally, the frequency of torque fluctuation generated in a real engine could vary from 0 Hz to about several hundred Hz. In contrast, an upper limit of a control band of a general torque controller, as disclosed in Patent Document 1, is at most several dozen Hz, which is close to a first resonance frequency of a mechanical system combining a dynamometer and a test piece. Therefore, even if an excitation frequency higher than the resonance frequency of the mechanical system is input into the dynamometer system including a conventional torque controller, the responsiveness of the torque controller is not sufficient, and the torque of the dynamometer cannot fluctuate at the amplitude as commanded.

In order to solve such a problem, it would be possible to increase the feedback gain of the shaft torque controller. However, if only such a adjustment of feedback gain is performed, it is difficult to improve the response characteristics, particularly in a frequency domain higher than an antiresonance point of the mechanical system. Further, if the feedback gain is excessively increased, the control system may become unstable depending on the operating conditions.

An object of the present invention is to provide a dynamometer system, which is capable of stably performing excitation amplitude control of torque, even at a frequency which is higher than a control band of a torque controller.

Means for Solving the Problems

In order to achieve the abovementioned object, a first aspect of the present invention provides a dynamometer system (for example, a test system 1 to be described later) including: a dynamometer (for example, an input side dynamometer 2 to be described later) connected to an input side of a test piece (for example, a test piece W to be described later); an inverter (for example, an inverter 3 to be described later) for supplying electric power to the dynamometer; a torque detector (for example, a shaft torque meter 5 to be described later) for detecting torque (for example, shaft torque to be described later) as a controlled variable of a system composed of the test piece and the dynamometer; an excitation torque command calculation unit (for example, an excitation torque command calculation unit 61 to be described later) for calculating an excitation torque command value, on the basis of an excitation frequency command value and an excitation amplitude command value, which are externally input; a torque command calculation unit (for example, a shaft torque command calculation unit 62 to be described later) for obtaining a torque command value by adding up a base torque command value, which is externally input, and the excitation torque command value; a feedback controller (for example, a shaft torque controller 63 to be described later) for determining a first control input value, such that a detection value of the torque detector becomes the torque command value; a feedforward input calculation unit (for example, a feedforward input calculation unit 64 to be described later) for obtaining a second control input value by removing components equal to or less than a predetermined frequency from the torque command value; and an addition unit (for example, an addition unit 65 to be described later) for obtaining a control input value for the inverter by adding up the first and second control input values. The excitation torque command calculation unit calculates the excitation torque command value, so as to eliminate a deviation between an amplitude value, which is calculated on the basis of a detection value of the torque detector, and the excitation amplitude command value.

In the first aspect of the present invention, the excitation torque command value is calculated from excitation frequency and excitation amplitude, and is added to the base torque command value to obtain a torque command value, which is input into the feedback controller and the feedforward input calculation unit. The feedback controller determines a first control input value, such that the torque detection value becomes the torque command value; and the feedforward input calculation unit determines a second control input value, by removing steady components equal to or less than a predetermined frequency from the torque command value. The control input value of the inverter of the dynamometer is determined by superimposing the second control input value, which is an alternating-current component, on the first control input value. As a result, even if the excitation frequency is changed beyond the control band of the feedback controller, components fluctuating at the excitation frequency can be included in the control input value; therefore, it is possible to control the torque of the dynamometer, at the excitation frequency as commanded. If a feedforward input of such an alternating-current component is merely superimposed, it may not be possible to cause the torque to fluctuate at the excitation amplitude as commanded. Accordingly, in the present invention, an excitation torque command value is calculated so as to eliminate a deviation between the amplitude value, which is calculated on the basis of the detection value of the torque detector, and the excitation amplitude command value. Therefore, if the torque does not fluctuate at the excitation amplitude as commanded, the excitation torque command value, which is input into the feedback controller and the feedforward input calculation unit, is inflated from the reference value. As described above, according to present invention, even if the excitation frequency is changed beyond the control band of the feedback controller, it is possible to stably perform excitation amplitude control of the torque, at the excitation frequency and the excitation amplitude as commanded.

In a second aspect of the dynamometer system, it is preferable that the excitation torque command calculation unit is provided with: a reference wave generation unit (for example, a reference wave generation unit 611 to be described later) for generating a sine wave in accordance with the excitation frequency command value; a torque amplitude detection unit (for example, a shaft torque amplitude detection unit 612 to be described later) for detecting a total peak-to-peak value of the torque detector's detection value of a single cycle of the sine wave; an excitation amplitude controller (for example, an excitation amplitude controller 613 to be described later) for calculating an amplitude correction value, so as to eliminate a deviation between the total peak-to-peak value and the excitation amplitude command value; an addition unit (for example, an addition unit 614 to be described later) for correcting the excitation amplitude command value by adding the amplitude correction value to the excitation amplitude command value; and a multiplication unit (for example, a multiplication unit 615 to be described later) for obtaining an excitation torque command value by multiplying the sine wave by the corrected excitation amplitude command value.

In the second aspect of the present invention, a total peak-to-peak value is detected in each excitation cycle of the detection value of the torque detector; an amplitude correction value is calculated so as to eliminate a deviation between the total peak-to-peak value and the excitation amplitude command value; and the sine wave is further multiplied by the excitation amplitude command value which is corrected by the amplitude correction value, thereby calculating an excitation torque command value. As a result, the excitation torque command value, which is input into the feedback controller and the feedforward input calculation unit, is inflated such that the total peak-to-peak value of the detection value of the torque detector reaches the excitation amplitude; therefore, it is possible to stably perform excitation amplitude control of the torque, at the excitation frequency and the excitation amplitude as commanded.

In a third aspect of the present invention, it is preferable that the dynamometer system is provided with: a reference wave generation unit (for example, a reference wave generation unit 611 to be described later) for generating a sine wave in accordance with the excitation frequency command value; a torque amplitude detection unit for detecting an amplitude value of the excitation frequency component of the torque detector's detection value; an excitation amplitude controller (for example, an excitation amplitude controller 613 to be described later) for calculating an amplitude correction value, so as to eliminate a deviation between the amplitude value and the excitation amplitude command value; an addition unit (for example, an addition unit 614 to be described later) for correcting the excitation amplitude command value by adding the amplitude correction value to the excitation amplitude command value; and a multiplication unit (for example, a multiplication unit 615 to be described later) for obtaining an excitation torque command value by multiplying the sine wave by the corrected excitation amplitude command value.

In the third aspect of the present invention, an amplitude value of the excitation frequency component is detected from the detection value of the torque detector; an amplitude correction value is calculated so as to eliminate a deviation between the amplitude value and the excitation amplitude command value; and the sine wave is further multiplied by the excitation amplitude command value which is corrected by the amplitude correction value, thereby calculating an excitation torque command value. Therefore, according to the present invention, if the torque detector's detection value includes a frequency component other than the excitation frequency component, the amplitude of the excitation frequency command component of the torque detector's detection value can be stably controlled, at the excitation amplitude as commanded.

In a fourth aspect of the present invention, it is preferable that the dynamometer system is further provided with a control input limiter (for example, a torque current amplitude limiter 68B to be described later) for detecting an amplitude value of the excitation frequency component of the control input value, and correcting the amplitude correction value to a small value, so as to limit the amplitude value to or below a predetermined upper limit.

According to the fourth aspect of the present invention, the amplitude value of the excitation frequency component of the control input value is limited to or below the upper limit, which is determined in accordance with the excitation frequency command value. As a result, it is possible to prevent the torque of the dynamometer from fluctuating at high frequency and large amplitude, and to eventually prevent the permanent magnet of the dynamometer from demagnetizing.

Effects of the Invention

As described above, according to the present invention, even if the excitation frequency is changed beyond the control band of the feedback controller, it is possible to stably perform excitation amplitude control of the torque, at the frequency and amplitude as commanded.

EXPLANATION OF REFERENCE NUMERALS

Figure 1:
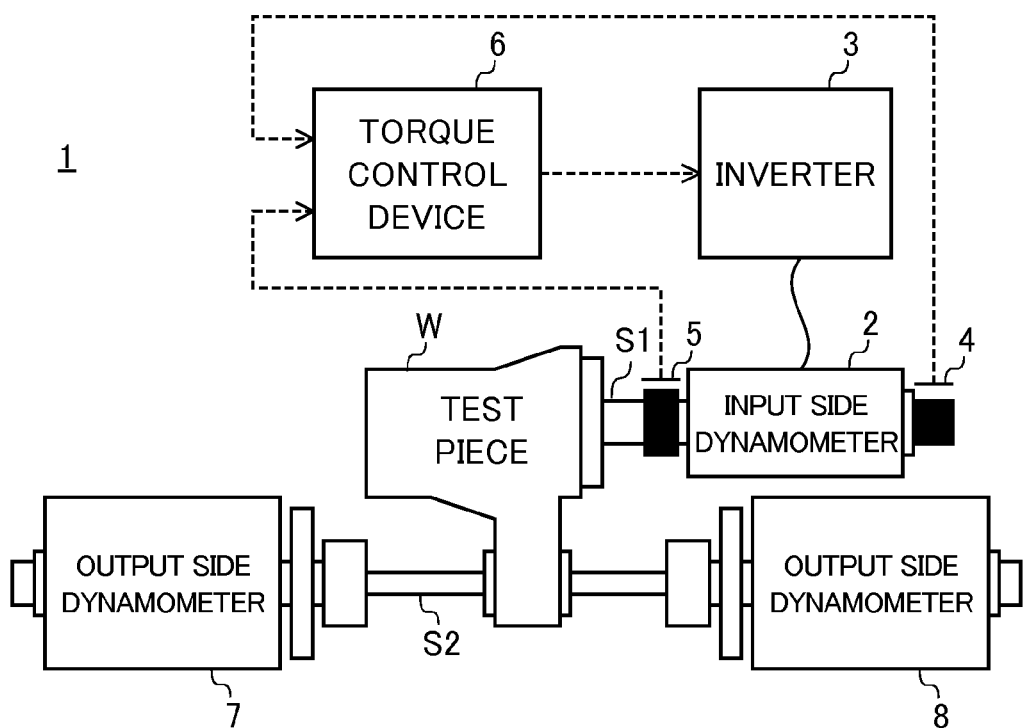
FIG. 1 is a block diagram showing a configuration of a drive-train test system as a dynamometer system according to an embodiment of the present invention.

1 . . . test system (dynamometer system)
W . . . test piece
S1 . . . input shaft
2 . . . input side dynamometer 3 ... inverter
5 ... shaft torque meter (torque detector)
6 ... torque control device
61 ... excitation torque command calculation unit
611 ... reference wave generation unit
612 ... shaft torque amplitude detection unit (torque amplitude detection unit)
613 ... excitation amplitude controller
614 ... addition unit
615 ... multiplication unit
62 ... shaft torque command calculation unit (torque command calculation unit)
63 ... shaft torque controller (feedback controller)
64 ... feedforward input calculation unit
65 ... addition unit
68B ... torque current amplitude limiter (control input limiter)

PREFERRED MODE FOR CARRYING OUT THE INVENTION

A drive-train test system as a dynamometer system according to an embodiment of the present invention is hereinafter described in detail with reference to the attached drawings.

FIG. 1 is a block diagram showing a configuration of a drive-train test system 1 of the present embodiment. FIG. 1 shows an example of the test system 1, in which a transmission of a vehicle having an FF drive system is used as a test piece W; however, the present invention is not limited thereto. The test piece W may be a transmission of a vehicle having an FR drive system.

The test system 1 is provided with: an input side dynamometer 2, which is coaxially connected with an input shaft S1 of the test piece W; an inverter 3 for supplying electric power to the input side dynamometer 2; a rotation detector 4 for detecting an angular velocity of the input side dynamometer 2; a shaft torque meter 5 for detecting shaft torque between the input side dynamometer 2 and the test piece W; a torque control device 6 for controlling torque of the input side dynamometer 2 on the basis of detection values, etc. of the rotation detector 4 and the shaft torque meter 5; and output side dynamometers 7 and 8, which are connected at both ends of the output shaft S2 of the test piece W, respectively.

The rotation detector 4 detects an angular velocity of the input side dynamometer 2, and transmits a signal, which is substantially proportional to the detection value, to the torque control device 6. The shaft torque meter 5 detects shaft torque, which acts on the shaft S1 between the input side dynamometer 2 and the test piece W, on the basis of, for example, a strain amount in an axial torsion direction, and transmits a signal, which is substantially proportional to the detection value, to the torque control device 6.

The inverter 3 converts DC power supplied from a DC power supply (not shown) into AC power, and supplies the converted power to the input side dynamometer 2. The torque control device 6 outputs a torque current command value of the inverter 3, on the basis of the detection value of the shaft torque meter 5 as feedback. A detailed configuration of the torque control device 6 will be described later in each embodiment.

With the test system 1, the input side dynamometer 2 generates driving torque in imitation of a real engine; and while inputting the driving torque into the input shaft S1 of the test piece W, the output side dynamometers 7 and 8 absorb transmission output power of the test piece W, thereby evaluating durability performance, quality, etc. of the test piece W.

First Embodiment

Next, a first embodiment of the torque control device is described in detail with reference to the drawings.

Figure 2:
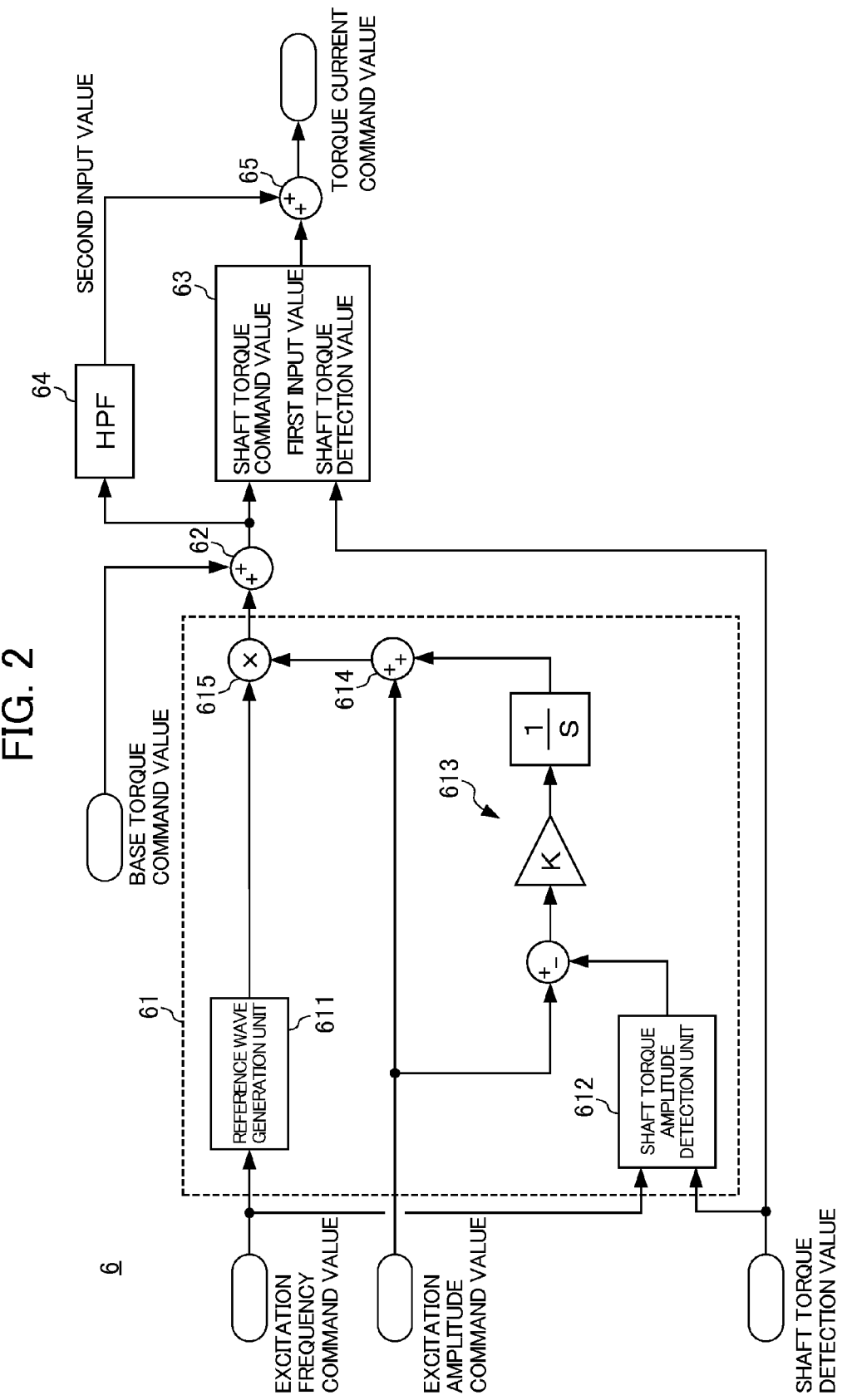
FIG. 2 is a block diagram showing a configuration of a torque control device of a first embodiment.

FIG. 2 is a block diagram showing a configuration of the torque control device 6 of the present embodiment. Upon receiving a base torque command value, an excitation frequency command value, and an excitation amplitude command value from an external arithmetic unit (not shown), and a detection value of the shaft torque meter, the torque control device 6 outputs a torque current command value that serves as a control input of the inverter. Here, the base torque corresponds to a component, in which a torque pulsation component (alternating current component) of an engine is removed from the torque generated by the dynamometer in imitation of a real engine; and the excitation frequency and the excitation amplitude respectively correspond to a frequency and an amplitude of the torque pulsation component.

The torque control device 6 is provided with: an excitation torque command calculation unit 61 for calculating an excitation torque command value; a shaft torque command calculation unit 62 for obtaining a shaft torque command value by adding up the excitation torque command value and the base torque command value; a shaft torque controller 63 for determining a first control input value; a feedforward input calculation unit 64 for determining a second control input value; and an addition unit 65 for obtaining a torque current command value by adding up the first and second control input values.

Figure 3:
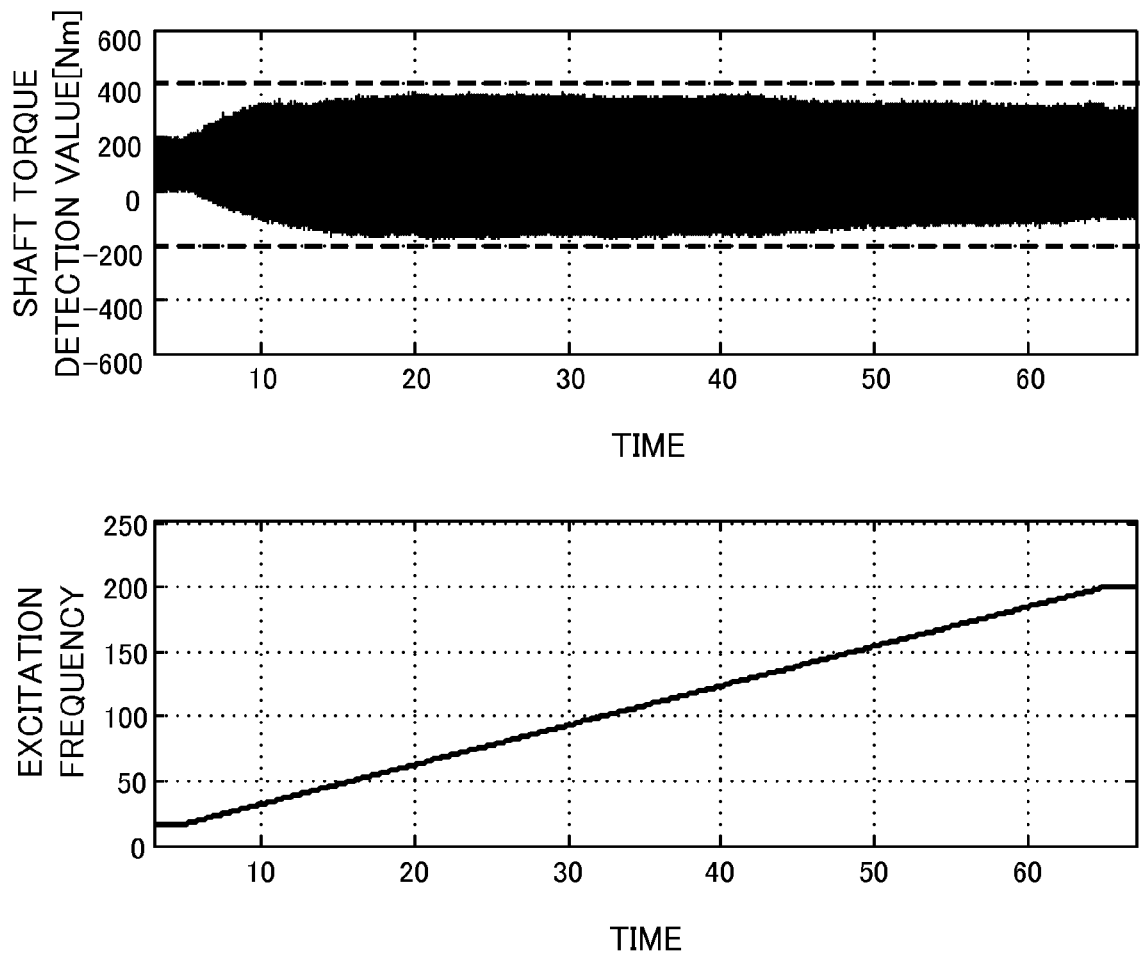
FIG. 3 is a diagram showing results of torque control by a conventional torque control device.

The shaft torque controller 63 determines the first control input value, such that a shaft torque detection value from the shaft torque meter becomes a shaft torque command value. An upper limit of a control band of the shaft torque detection value in relation to the shaft torque command value of the shaft torque controller 63 is approximately a first resonance frequency (for example, 20 Hz as shown in FIG. 3 to be described later) of the mechanical system composed of the input side dynamometer 2 and the test piece W. Therefore, as will be described later with reference to FIG. 3, sufficient responsiveness cannot be obtained only with the shaft torque controller 63, in relation to the shaft torque command value of a frequency beyond the first resonance frequency of the mechanical system. The shaft torque controller 63 to be used is designed based on a well-known feedback algorithm such as PID control or μ-design method.

The feedforward input calculation unit 64 is a highpass filter, and obtains a second control input value by removing components equal to or less than a predetermined cut-off frequency from the shaft torque command value. The cut-off frequency of the feedforward input calculation unit 64 is set in accordance with the control band of the shaft torque controller 63; more specifically, for example, it is set to a frequency in the vicinity of the upper limit of the control band.

The excitation torque command calculation unit 61 is configured by including a reference wave generation unit 611, a shaft torque amplitude detection unit 612, an excitation amplitude controller 613, an addition unit 614, and a multiplication unit 615.

The reference wave generation unit 611 generates a sine wave having a frequency of the excitation frequency command value as a reference wave. Amplitude of the reference wave is set to, for example, 1.

The shaft torque amplitude detection unit 612 detects a difference (total peak-to-peak value) between the maximum value and the minimum value of the shaft torque detection value during a single cycle of the reference wave.

The excitation amplitude controller 613 calculates an amplitude correction value, so as to eliminate a deviation between the excitation amplitude command value and the total peak-to-peak value detected by the shaft torque amplitude detection unit 612. More specifically, the excitation amplitude controller 613 obtains a deviation by subtracting the total peak-to-peak value from the excitation amplitude command value, multiplies the deviation by an amplitude control gain K, and performs an integration operation thereon, thereby obtaining an amplitude correction value.

The addition unit 614 obtains a correction value of the excitation amplitude command value, by adding up the excitation amplitude command value to the amplitude correction value calculated by the excitation amplitude controller 613.

The multiplication unit 615 obtains an excitation torque command value, by multiplying the reference wave generated by the reference wave generation unit 611, by the correction value of the excitation amplitude command value.

The excitation torque command calculation unit 61 is configured as above, and uses an amplitude control gain K to adjust the speed of operation for correcting the excitation torque command value only on the basis of the excitation frequency command value and excitation amplitude command value.

Next, effects of torque control by the torque control device 6 of the present embodiment are described in comparison with a conventional torque control device. In following descriptions, unlike the torque control device 6 of the above embodiment, the conventional torque control device performs feedback control, only with a shaft torque controller, without performing a feedforward input. In the conventional torque control device, a shaft torque command value to be input into the shaft torque controller is defined by open loop control, and more specifically, it is defined by removing the shaft torque amplitude detection unit 612 and the excitation amplitude controller 613 from the excitation torque command calculation unit 61 of the present embodiment.

Figure 4:
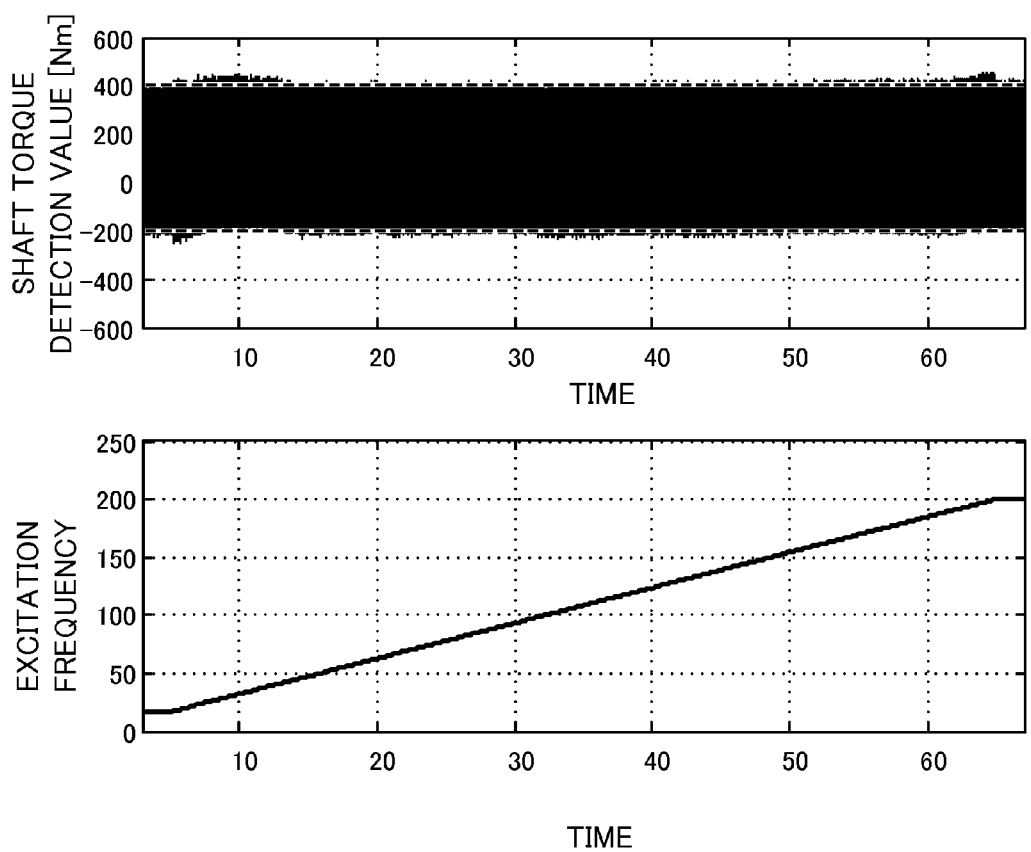
FIG. 4 is a diagram showing results of torque control by the torque control device of the first embodiment.

FIG. 3 is a diagram showing results of the torque control by the conventional torque control device. FIG. 4 is a diagram showing results of the torque control by the torque control device of the present embodiment. More specifically, in FIGS. 3 and 4, the upper section is a graph showing temporal change in the shaft torque detection value; and the lower section shows temporal change in the excitation frequency command value. FIGS. 3 and 4 show control results, in which the base torque command value and the excitation amplitude command value are respectively maintained at constant values such that the maximum value (400 Nm) and the minimum value (200 Nm) of the shaft torque detection value reach the broken lines; while the excitation frequency command value is continuously changed over time from 20 Hz, which is approximately the upper limit of the control band of the shaft torque controller, to 200 Hz.

As shown in FIG. 3, in the conventional torque control device, the shaft torque detection value does not reach the maximum value and the minimum value indicated by the broken lines. This means that, in the frequency domain beyond the control band of the shaft torque controller, the conventional torque control device cannot perform excitation control to follow the excitation amplitude command. In contrast, as shown in FIG. 4, according to the torque control device of the present embodiment, the maximum value and the minimum value of the shaft torque detection value reach the broken lines, regardless of the excitation frequency command value; and excitation control can be performed, at frequency and amplitude substantially as commanded.

According to the present embodiment, the following effects are achieved.

(A) According to the present embodiment, the torque current command value to be input into the inverter 3 is determined by superimposing the second control input value determined by the feedforward input calculation unit 64 on the first control input value determined by the shaft torque controller 63. As a result, even if the excitation frequency command value is changed beyond the control band of the shaft torque controller 63, components fluctuating at the excitation frequency can be included in the torque current command value; therefore, it is possible to control the torque of the input side dynamometer 2, at the excitation frequency as commanded. In the present embodiment, the excitation torque command value to be input into the shaft torque controller 63 and the feedforward input calculation unit 64 is inflated from the reference value, so as to eliminate the deviation between the amplitude value and the excitation amplitude command value, which are calculated on the basis of the shaft torque detection value. As a result, as shown in FIG. 4, it is possible to stably perform excitation amplitude control of the torque of input side dynamometer 2, at the excitation frequency and the excitation amplitude as commanded.

(B) In the present embodiment, a total peak-to-peak value of the shaft torque detection value is detected; and the excitation amplitude controller 613 calculates an amplitude correction value, so as to eliminate the deviation between the total peak-to-peak value and the excitation amplitude command value, thereby correcting the excitation torque command value. As a result, the excitation torque command value to be input into the shaft torque controller 63 and the feedforward input calculation unit 64 is inflated from the reference value, such that the total peak-to-peak value of the shaft torque detection value reaches the excitation amplitude; therefore, it is possible to stably perform excitation amplitude control of the torque, at the excitation frequency and the excitation amplitude as commanded.

Second Embodiment

Next, a second embodiment of the present invention is described.

A torque control device of the present embodiment differs from the torque control device of first embodiment described with reference to FIG. 2, only in configuration of the torque amplitude detection unit 612. The torque amplitude detection unit of the present embodiment detects an amplitude value of an excitation frequency component of the shaft torque detection value. The excitation amplitude controller 613 calculates an amplitude correction value, so as to eliminate a deviation between the excitation amplitude command value and the amplitude value of the excitation frequency component detected by the torque amplitude detection unit.

According to the present embodiment, the following effects are achieved, in addition to the above effects (A).

(C) According to the present embodiment, if the shaft torque detection value includes a frequency component other than the excitation frequency component, the amplitude of the excitation frequency command component of the shaft torque detection value can be stably controlled, at the excitation amplitude as commanded.

Third Embodiment

Next, a third embodiment of the present invention is described with reference to FIG. 5.

Figure 5:
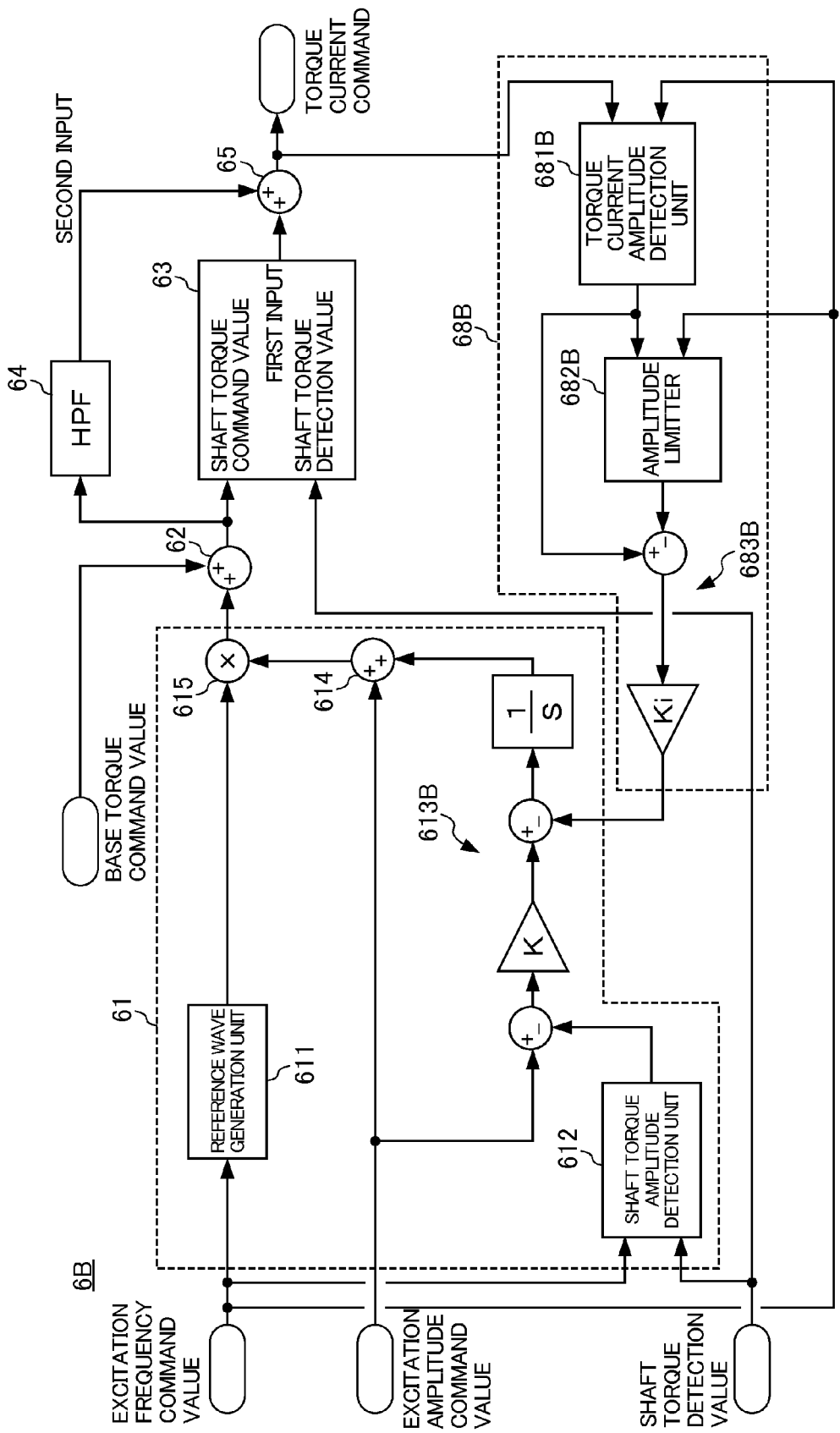
FIG. 5 is a block diagram showing a configuration of a torque control device of a third embodiment.

FIG. 5 is a block diagram showing a configuration of a torque control device 6B of the present embodiment. The torque control device 6B of the present embodiment differs from the torque control device 6 of the first embodiment described with reference to FIG. 2, in that a torque current amplitude limiter 68B for limiting an amplitude of the torque current command value is connected to in excitation amplitude controller 613B.

The torque current amplitude limiter 68B is provided with a torque current amplitude detection unit 681B, an amplitude limit value calculation unit 682B, and a limitation input calculation unit 683B.

The torque current amplitude detection unit 681B detects an amplitude value of the excitation frequency component of the torque current command value.

The amplitude limit value calculation unit 682B calculates a torque amplitude limit value, on the basis of the excitation frequency command value and the amplitude value detected by the torque current amplitude detection unit 618B. The torque amplitude limit value corresponds to an upper limit which is set to the amplitude value of the excitation frequency component of the torque current command value in order to prevent the permanent magnet of the dynamometer from demagnetizing. The torque amplitude limit value is set to be smaller, as the excitation frequency command value becomes larger.

The limitation input calculation unit 683B calculates a limitation input, by subtracting the torque amplitude limit value, which is calculated by the amplitude limit value calculation unit 682B, from the amplitude value detected by the torque current amplitude detection unit 618B, and multiplying the subtraction result by a torque current amplitude control gain Ki.

The excitation amplitude controller 613B subtracts the limitation input from the deviation between the excitation amplitude command value and the amplitude value detected by the shaft torque amplitude detection unit 612 to obtain a value, and performs an integration operation on the obtained value, thereby calculating an amplitude correction value. As a result, the amplitude correction value is corrected to a smaller value, through the limitation input from the torque current amplitude limiter 68B, such that the amplitude value of the excitation frequency component of the torque current command value is limited to or below a predetermined upper limit.

With the torque current amplitude limiter 68B which is configured as described above, the speed of operation to limit the torque current command value to or below a predetermined upper limit is adjusted by way of the torque current amplitude control gain Ki.

According to the present embodiment, the following effects are achieved, in addition to the above effects (A).

(D) In the present embodiment, the torque current amplitude limiter 68B limits the amplitude value of the excitation frequency component of the torque current command value to or below a predetermined upper limit, which is determined in accordance with the excitation frequency command value. As a result, it is possible to prevent the torque of the input side dynamometer 2 from fluctuating at high frequency and large amplitude, and to eventually prevent the permanent magnet of the dynamometer from demagnetizing.

An example has been described above, in which a controlled variable of the torque control device is used as a detection value of the shaft torque meter; however, the present invention is not limited thereto. In a dynamometer system which is provided with a rocking type dynamometer, a load cell is connected between a base and a tip of a torque arm of a rocking piece including the dynamometer, thereby detecting torque, on the basis of distortion detected by the load cell. Therefore, the present invention may use a controlled variable of the torque control device as a detection value of the load cell.

The invention claimed is:

1. A dynamometer system comprising:
   a dynamometer connected to an input side of a test piece;
   an inverter for supplying electric power to the dynamometer; and
   a torque detector for detecting torque as a controlled variable of a system composed of the test piece and the dynamometer;
   the dynamometer system further comprising:
   an excitation torque command calculation unit for calculating an excitation torque command value, on the basis of an excitation frequency command value and an excitation amplitude command value, which are externally input;
   a torque command calculation unit for obtaining a torque command value by adding up a base torque command value, which is externally inputted, and the excitation torque command value;
   a feedback controller for determining a first control input value, such that a detection value of the torque detector becomes the torque command value;
   a feedforward input calculation unit for obtaining a second control input value by removing components equal to or less than a predetermined frequency from the torque command value; and
   an addition unit for obtaining a control input value for the inverter by adding up the first and second control input values;
   wherein the excitation torque command calculation unit calculates the excitation torque command value, so as to eliminate a deviation between an amplitude value, which is calculated on the basis of a detection value of the torque detector, and the excitation amplitude command value.

2. The dynamometer system according to claim 1, wherein the excitation torque command calculation unit comprises:
   a reference wave generation unit for generating a sine wave in accordance with the excitation frequency command value;
   a torque amplitude detection unit for detecting a total peak-to-peak value of the torque detection value of a single cycle of the sine wave;
   an excitation amplitude controller for calculating an amplitude correction value, so as to eliminate a deviation between the total peak-to-peak value and the excitation amplitude command value;
   an addition unit for correcting the excitation amplitude command value by adding the amplitude correction value to the excitation amplitude command value; and
   a multiplication unit for obtaining an excitation torque command value by multiplying the sine wave by the corrected excitation amplitude command value.

3. The dynamometer system according to claim 2, further comprising:
   a control input limiter for detecting an amplitude value of the excitation frequency component of the control input value, and correcting the amplitude correction value to a small value, so as to limit the amplitude value to or below an upper limit, which is determined in accordance with the excitation frequency command value.

4. The dynamometer system according to claim 1,
wherein the excitation torque command calculation unit comprises:

a reference wave generation unit for generating a sine wave in accordance with the excitation frequency command value;

a torque amplitude detection unit for detecting an amplitude value of the excitation frequency component of the torque detection value;

an excitation amplitude controller for calculating an amplitude correction value, so as to eliminate a deviation between the amplitude value and the excitation amplitude command value;

an addition unit for correcting the excitation amplitude command value by adding the amplitude correction value to the excitation amplitude command value; and a multiplication unit for obtaining an excitation torque command value by multiplying the sine wave by the corrected excitation amplitude command value.

5. The dynamometer system according to claim 4, further comprising:

a control input limiter for detecting an amplitude value of the excitation frequency component of the control input value, and correcting the amplitude correction value to a small value, so as to limit the amplitude value to or below an upper limit, which is determined in accordance with the excitation frequency command value.

* * * * *